US011472319B2

(12) United States Patent
Kaatz et al.

(10) Patent No.: US 11,472,319 B2
(45) Date of Patent: Oct. 18, 2022

(54) LOAD FLOOR ARRANGEMENT FOR A MOTOR VEHICLE

(71) Applicant: Ford Global Technologies, LLC, Dearborn, MI (US)

(72) Inventors: Sascha Kaatz, Langenfeld (DE); Tobias Lotz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 17/174,629

(22) Filed: Feb. 12, 2021

(65) Prior Publication Data

US 2021/0284050 A1 Sep. 16, 2021

(30) Foreign Application Priority Data

Mar. 16, 2020 (DE) ........................ 102020107163.9

(51) Int. Cl.
*B60N 2/36* (2006.01)
*B60R 21/02* (2006.01)
*B60R 5/04* (2006.01)

(52) U.S. Cl.
CPC .......... *B60N 2/36* (2013.01); *B60N 2002/363* (2013.01); *B60R 5/04* (2013.01); *B60R 21/026* (2013.01)

(58) Field of Classification Search
CPC ........ B60N 2/36; B60N 2002/363; B60R 5/04
USPC ........ 296/65.09, 65.01, 65.16, 69, 66, 37.16
See application file for complete search history.

(56) References Cited

U.S. PATENT DOCUMENTS 4,979,772 A * 12/1990 Carey .................. B60N 2/3011 296/97.23
5,669,537 A * 9/1997 Saleem ..................... B60R 7/02 224/42.32
7,159,922 B2 * 1/2007 Iyoda ..................... B60N 2/309 296/66
8,172,295 B2 * 5/2012 Fischer ..................... B60R 5/04 296/37.16
8,353,550 B1 * 1/2013 Lucas ...................... B60N 2/36 296/37.16
8,528,957 B2 * 9/2013 Ugalde ..................... B60R 5/04 280/783

(Continued)

FOREIGN PATENT DOCUMENTS

DE 2113367 A1 10/1971
DE 10261399 A1 7/2004

(Continued)

*Primary Examiner* — Jason S Morrow
*Assistant Examiner* — Wenwei Zhuo
(74) *Attorney, Agent, or Firm* — Vichit Chea; Price Heneveld LLP

(57) ABSTRACT

A load floor arrangement for a motor vehicle is provided. The arrangement has a rear load floor element which, in a floor position, forms a floor portion of a load space. The load floor arrangement has a front load floor element which is connected to a backrest of a vehicle seat so as to be pivotable about a floor element pivot axis extending in the vehicle transverse direction, whereby it is adjustable between a contact position and at least one pivoted position in which its inclination relative to the horizontal is reduced compared to the contact position, when the backrest is inclined forwards in an inclined position about a backrest pivot axis.

20 Claims, 9 Drawing Sheets

(56) References Cited

U.S. PATENT DOCUMENTS

| | | | | |
|---|---|---|---|---|
| 2007/0013201 A1* | 1/2007 | Wagner | B60N 2/36 | 296/24.43 |
| 2013/0328341 A1* | 12/2013 | Maguire | B60N 2/065 | 296/65.13 |
| 2014/0265411 A1* | 9/2014 | Thota | B60N 2/36 | 296/37.16 |
| 2015/0084377 A1* | 3/2015 | Thota | B60N 2/36 | 296/193.07 |
| 2019/0054848 A1* | 2/2019 | Vo | B60N 3/004 | |

FOREIGN PATENT DOCUMENTS

| | | |
|---|---|---|
| EP | 2078636 A2 | 7/2009 |
| FR | 2863230 A1 | 6/2005 |

* cited by examiner 1a
2
2.1
2.2
3
4
5
20
21
22
30
A
X,H
Z 25
26
27
27.1
27.2
27.3

LOAD FLOOR ARRANGEMENT FOR A MOTOR VEHICLE

CROSS-REFERENCE TO RELATED APPLICATION

This application claims foreign priority benefits under 35 U.S.C. § 119(a)-(d) to German Application No. 102020107163.9 filed Mar. 16, 2020, which is hereby incorporated by reference in its entirety.

FIELD OF THE DISCLOSURE

The present disclosure generally relates to motor vehicles, and more particularly relates to a load floor arrangement for a motor vehicle.

BACKGROUND OF THE DISCLOSURE

In various passenger cars, such as, for example, estate cars, people carriers, saloon cars and compact cars, a load space is provided in the rear region of the vehicle. The load space is accessible via the boot lid and can optionally be made larger by folding down the rear, or rearmost, row of seats. The floor of the load space is often formed by a removable floor panel, beneath which there is additional stowage space. When the rear seat is folded down, the backrests are folded forwards until the rear surface of the backrest ultimately extends almost horizontally. In the rear region, the surface of the backrest generally adjoins the surface of the floor panel substantially without a gap, so that a continuous enlarged load floor is formed. However, it is in many cases not possible, for structural reasons, to transfer the surface of the backrest into an exactly horizontal position; instead, there typically remains a certain upward slope, for example between 10° and 30°, from the rear to the front. That is to say, although the load floor so enlarged has a continuous load surface, the load surface is usually not flat but has a kink in the transition region from the floor panel to the backrest.

SUMMARY OF THE DISCLOSURE

According to a first aspect of the present disclosure, a load floor arrangement for a motor vehicle is provided. The load floor arrangement includes a rear load floor element that forms a floor portion of a load space in a floor position, and a front load floor element connected to a backrest of a vehicle seat and pivotable about a floor element pivot axis extending in a vehicle transverse direction, wherein the front load floor element is adjustable between a contact position and at least one pivoted position in which an inclination of the front load floor element relative to a horizontal is reduced compared to the contact position, when the backrest is inclined forwards in an inclined position about a backrest pivot axis.

According to a second aspect of the present disclosure, a motor vehicle is provided. The motor vehicle includes a load space, a vehicle seat having a backrest, and a load floor arrangement comprising a rear load floor element that forms a floor portion of the load space in a floor position, and a front load floor element connected to the backrest of the vehicle seat and pivotable about a floor element pivot axis extending in a vehicle transverse direction, wherein the front load floor element is adjustable between a contact position and at least one pivoted position in which an inclination of the front load floor element relative to the horizontal is reduced compared to the contact position, when the backrest is inclined forwards in an inclined position about a backrest pivot axis.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1A, 1B, 1C, 1D:
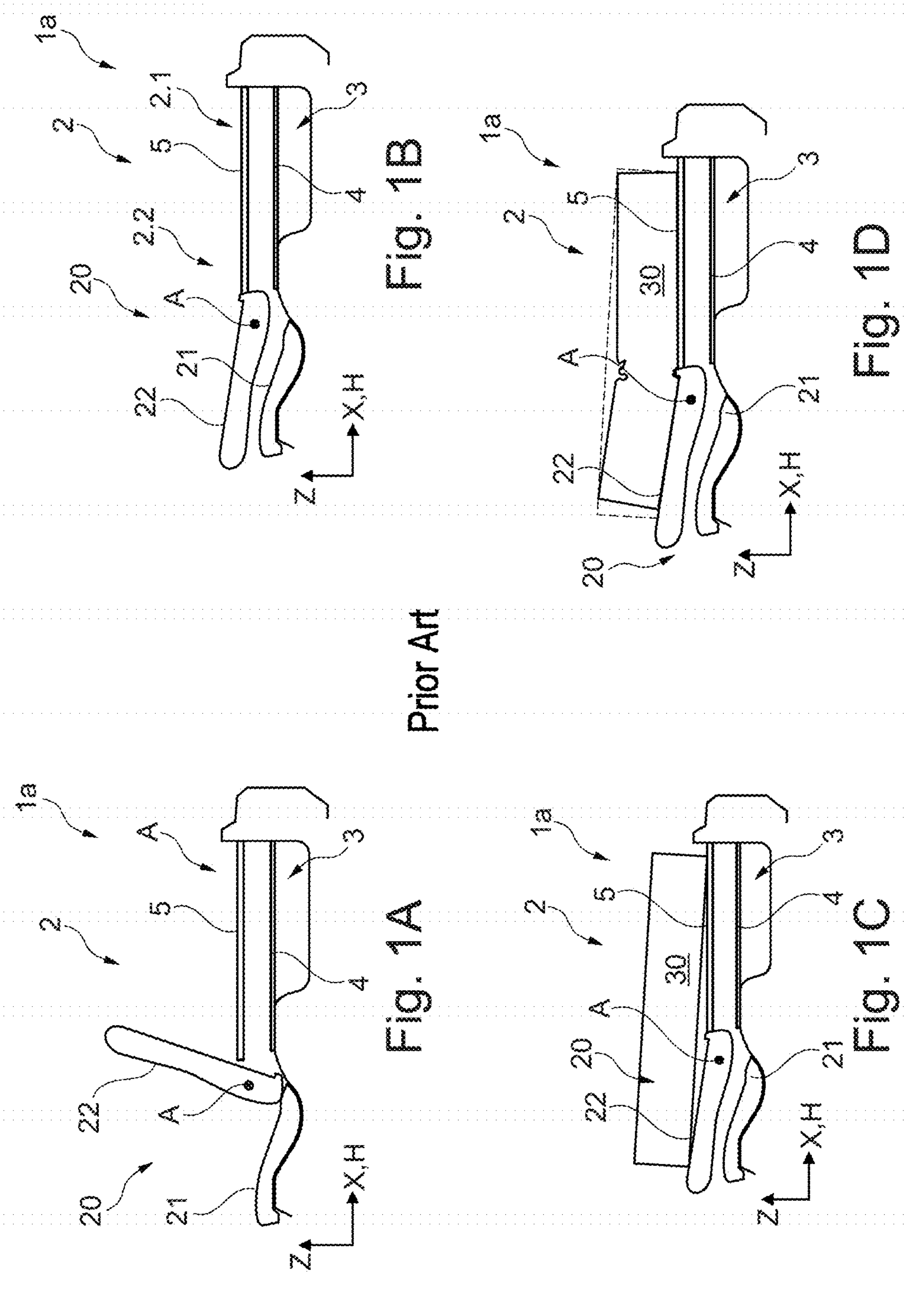
FIG. 1A is a side view representation of a load floor arrangement with a seat back upright, according to the prior art.
FIG. 1B is a side view representation of the load floor arrangement with the seat back folded down, according to the prior art.
FIG. 1C is a side view representation of the load floor arrangement with a piece of cargo, according to the prior art.
FIG. 1D is a side view representation of the load floor arrangement with the piece of cargo, according to the prior art.

In the various figures, identical parts are always provided with the same reference numerals, so that such parts are generally also only described once.

FIGS. 1A-1F show different representations of a load floor arrangement 1*a* for a motor vehicle according to the prior art. A load space 2 can be seen, which in FIG. 1A is arranged behind a vehicle seat 20 of a rear row of seats. In the load space 2 there are arranged a lower load floor element 4 and a rear load floor element 5, both of which are in the form of a panel and extend parallel to the horizontal H, which is spanned by the X-axis and the Y-axis (extending perpendicularly to the plane of the drawing) of the motor vehicle. In normal operation of the motor vehicle, the lower load floor element 4 generally remains in its position and serves to cover a spare-wheel well 3. The rear load floor element 5 is spaced apart therefrom along the vertically extending Z-axis. In the floor position shown in FIGS. 1A-1D it forms a first floor portion 2.1 of the load space 2, which is intended to be loaded with luggage or other cargo. In FIG. 1A, the vehicle seat 20 is in a sitting position, wherein a backrest 22 extends upwards above a seat element 21. The front edge of the rear load floor element 5 is approximately flush with the rear side of the backrest 22.

FIG. 1B shows the backrest 22 in an inclined position in which the backrest is inclined forwards relative to the seat element 21 and the remainder of the motor vehicle and is at an angle of inclination of approximately 15° relative to the horizontal H. The rear side of the backrest 22 thereby forms a second floor portion 2.2 of the (now expanded) load space 2, which adjoins the first floor portion 2.1 at the front. Although the rear side of the backrest 22 is substantially flat, it does not form an overall flat load surface with the rear load floor element 5, but there is a kink at the transition from the rear load floor element 5 to the backrest 22. As is shown in FIGS. 1C and 1D, this can be a problem if a single, long piece of cargo 30 is to be transported in the load space 2. In some circumstances, as shown, this piece of cargo is supported only in a part-region of the backrest 22 and in a part-region of the rear load floor element 5 and is unsupported between those part-regions over a substantial portion of its length. In an extreme case, as is indicated in FIG. 1D, this can result in bending or breaking of the piece of cargo 30.

Figure 1E:
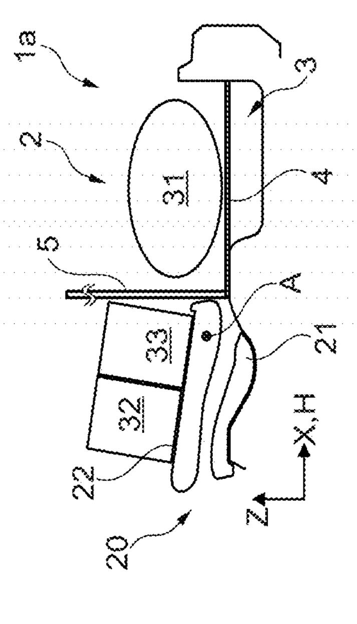
FIG. 1E is a side view representation of the load floor arrangement with a rear load floor element upright, according to the prior art.
Figure 1F:
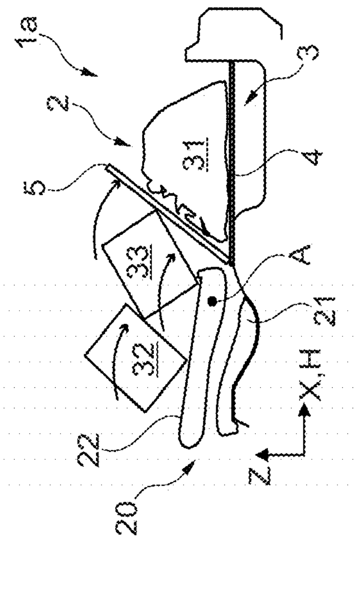
FIG. 1F is a side view representation of the load floor arrangement, according to the prior art.

FIG. 1E likewise shows the backrest 22 in the inclined position, but wherein the rear floor element 5 has been raised into a wall position in which it extends substantially vertically and is supported within the load space 2 in a manner not shown in detail here. The rear load floor element 5 thereby functions as a separating wall by means of which, for example, a damageable piece of cargo 31 positioned on the lower load floor element 4 is to be protected from two heavy pieces of cargo 32, 33 which are placed on the backrest 22. The inclination of the backrest 22 relative to the horizontal H increases the risk, in particular in the case of forwards acceleration of the motor vehicle, that the heavy pieces of cargo 32, 33 will shift and/or fall over and thus push against the upright rear load floor element 5, which can ultimately result in the rear load floor element giving way, as shown in FIG. 1F. This in turn can lead to the damageable piece of cargo 31 being damaged or destroyed.

Figure 2A:
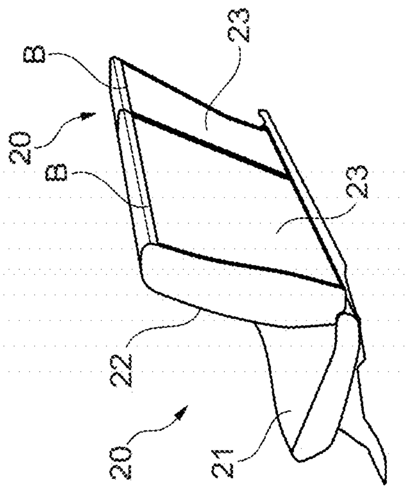
FIG. 2A is a rear perspective view of a rear bench-type seat of a motor vehicle with part of a first embodiment of a load floor arrangement in a first position.
Figure 2B:
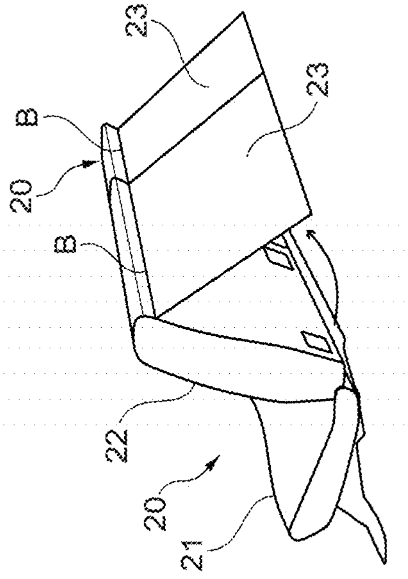
FIG. 2B is a rear perspective view of the rear bench-type seat with the front load floor element in a possible pivoted position.

FIG. 2A and FIG. 2B each show perspective representations of a rear row of seats of a first embodiment of a load floor arrangement 1 according to one embodiment of the present disclosure, which has certain components that generally largely correspond to the load floor arrangement 1*a* shown in FIG. 1A-1F and in that respect will not be described again. However, in this design the backrest 22 of each vehicle seat 20 has a front load floor element 23 which is pivotable relative to the backrest 22 about a floor element pivot axis B. The floor element pivot axis B extends in the vehicle transverse direction, that is to say parallel to the Y-axis, and is arranged, based on the sitting position of the vehicle seat 20 shown in FIGS. 2A and 2B, at an upper end of the front load floor element 23. FIG. 2A shows a contact position, in which the front load floor element 23 lies against the backrest 22, while FIG. 2B shows a possible pivoted position, in which the load floor element 23 protrudes from the backrest 22.

Figure 2C:
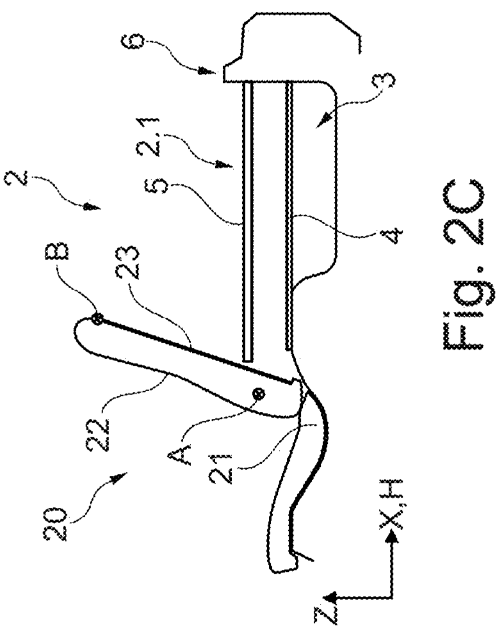
FIG. 2C is a side view of the load floor arrangement with the vehicle seat in a sitting position.
Figure 2D:
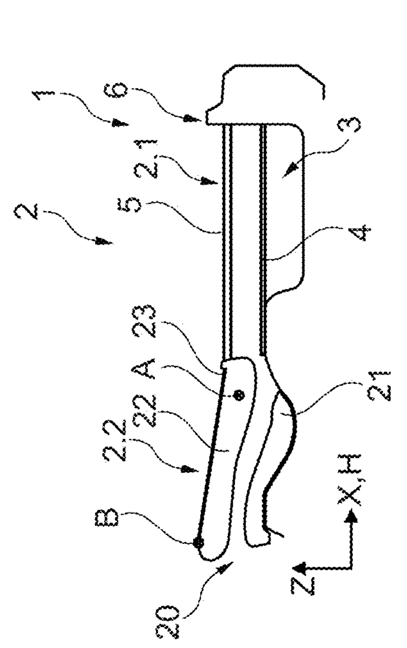
FIG. 2D is a side view of the load floor arrangement with the vehicle seat in an inclined position.
Figure 2E:
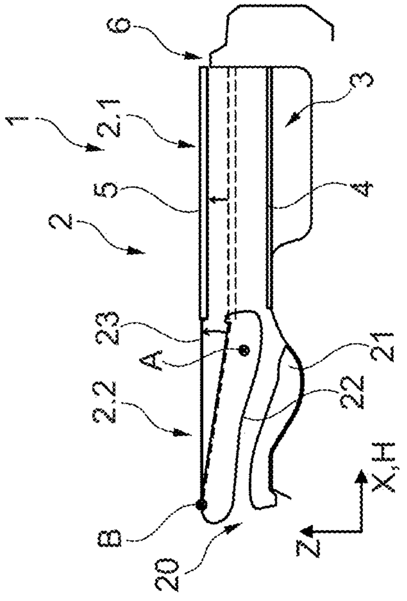
FIG. 2E is a side view of the load floor arrangement with the vehicle seat in an inclined position and a front load floor element in a first pivoted position.

FIG. 2C is a side view of the load floor arrangement 1, in which the backrest 22 is in the sitting position and the front load floor element 23 is in the contact position. The rear load floor element 5 is arranged in a first floor position parallel to the horizontal H, in which it is arranged significantly below a rear loading sill 6 of the load space 2. If the usable surface of the load space 2 is to be expanded, the backrest 22 is pivoted forwards about the backrest pivot axis A into the inclined position, as is shown in FIG. 2D. The load floor arrangement 1 in this position can also be used in this state but does not offer any advantage over the conventional load floor arrangement 1*a*. In order to utilize the advantages of the present design, the front load floor element 23 is pivoted, as shown in FIG. 2E, from the contact position, in which it has an inclination of approximately 15° relative to the horizontal H, into a first pivoted position, in which it is arranged parallel to the horizontal H. The front load floor element 23 is supported in the first pivoted position relative to the backrest 22 by a support arrangement 25, which has been omitted from the overall representations of the load floor arrangement 1 for reasons of clarity but is explained in FIGS. 6A-10H in the advantageous embodiments thereof.

Figure 2F:
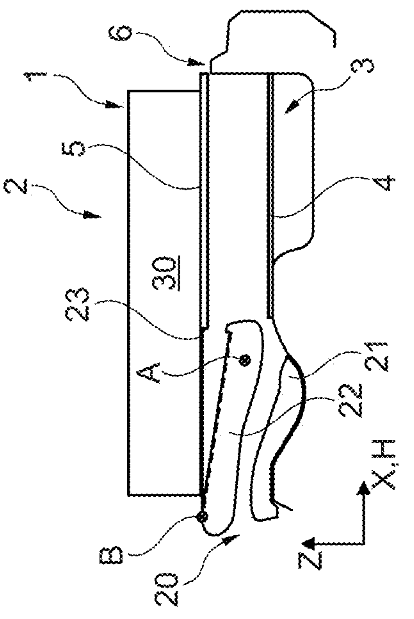
FIG. 2F is a side view, corresponding to FIG. 2E, of the load floor arrangement and of a piece of cargo.
Figure 2G:
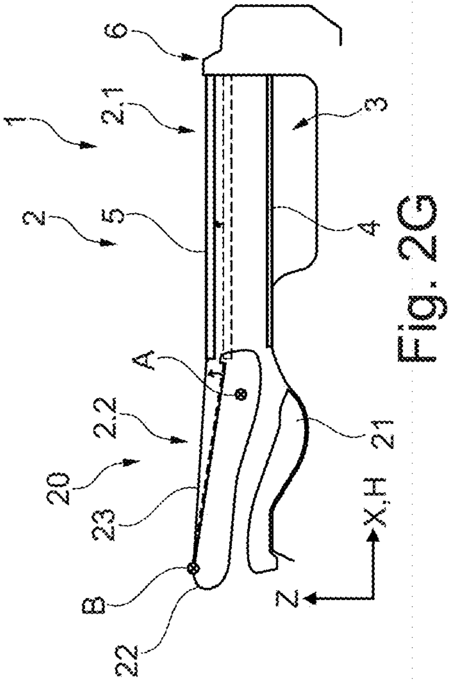
FIG. 2G is a side view, corresponding to FIG. 2E, of the load floor arrangement with the front load floor element in a second pivoted position.

Furthermore, the rear load floor element 5 is moved into a second floor position in which it is arranged higher than in the first floor position. More specifically, it is arranged above the rear loading sill 6. The rear load floor element 5 thereby adjoins the front load floor element 23 almost without a gap, so that the two load floor elements 5, 23 together form a flat, horizontal surface. In particular, a rear edge of the front load floor element 23 either has no vertical offset relative to a front edge of the rear load floor element 5 or has an offset of at most a few millimeters, which is negligible. Accordingly, as is shown in FIG. 2F, a long piece of cargo 30 can be stored horizontally, wherein it is supported over its entire length. There is accordingly no risk of sagging or breaking. FIG. 2G shows a configuration in which the rear load floor element 5 is arranged in a third floor position parallel to the horizontal H but at the level of the rear loading sill 6. In order to achieve a junction with the rear load floor element 5 that is as gap-free as possible, the front load floor element 23 is arranged in a second supported position in which it is flush with the rear load floor element 5 without any appreciable offset but also has a slight inclination of less than 5° relative to the horizontal H. In this respect, it is possible with the front load floor element 23 to reduce a height difference relative to the rear load floor element 5 when the rear load floor element 5 is arranged in horizontal alignment with the rear loading sill 6. There may accordingly be a slight kink in the load surface overall, but this is negligible for the majority of pieces of cargo and does not have any disadvantageous effects.

Figure 2H:
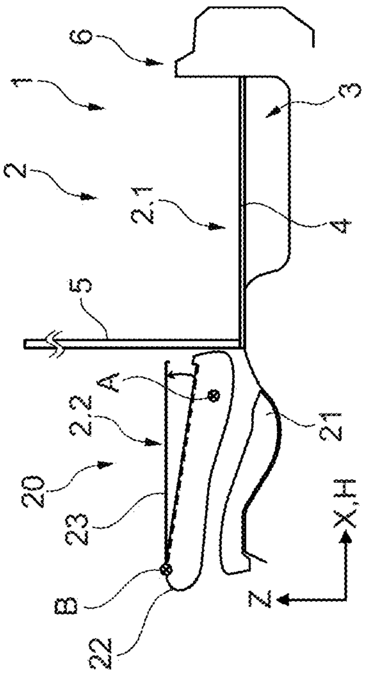
FIG. 2H is a side view of the load floor arrangement of FIG. 2E with the vehicle seat in the inclined position and a front load floor element in a pivoted position and a rear load floor element in a wall position.

FIG. 2H shows a configuration in which the front load floor element 23 is again arranged in the first pivoted position and thus horizontally, while the rear load floor element 5 is arranged perpendicularly in a wall position. In this case, a first floor portion 2.1 of the load space is formed by the lower load floor element 4, while a second floor portion 2.2 is formed by the front load floor element 23 and is separated from the first floor portion 2.1 by the rear load floor element 5, which now advantageously functions as a separating wall. Since the second floor portion 2.2 forms a horizontal plane, pieces of cargo (not shown here) can be set down without there being an increased risk of shifting or falling over. Accordingly, pieces of cargo placed on the first floor region 2.1 are also better protected against damage.

Figure 3A:
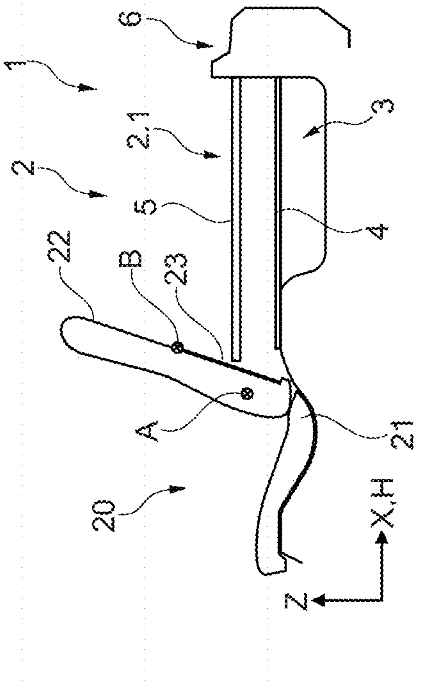
FIG. 3A is a side view of a second embodiment of a load floor arrangement with a vehicle seat in a sitting position.
Figure 3B:
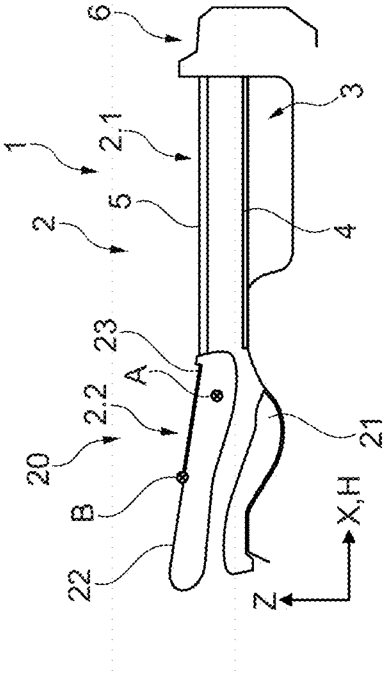
FIG. 3B is a side view of the load floor arrangement of FIG. 3A with the vehicle seat in an inclined position.
Figure 3C:
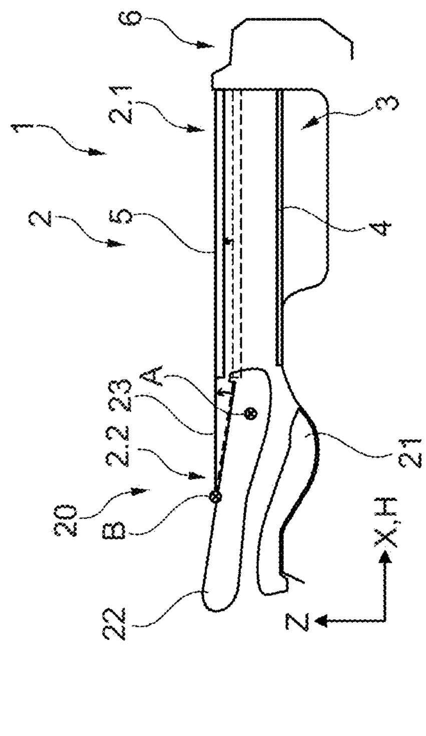
FIG. 3C is a side view of the load floor arrangement of FIG. 3A with the vehicle seat in the inclined position and a front load floor element in a pivoted position.

FIGS. 3A-3C show a second embodiment of a load floor arrangement 1 according to the present disclosure, which differs from the first embodiment in that the floor element pivot axis B is arranged not in the region of an upper end of the backrest 22 but approximately in the middle. Accordingly, the front load floor element 23 pivotably arranged thereon is shorter. FIGS. 3A and 3B show the rear load floor element 5 in each case in a first floor position beneath the rear loading sill 6 and the backrest 22 in a sitting position, or inclined position, while the front load floor element 23 is in the contact position. If the front load floor element 23 is adjusted according to FIG. 3C into a pivoted position in which it is arranged horizontally and is supported by means of the support arrangement 25, not shown, and the rear load floor element 5 is moved into a second floor position, a closed, horizontal load surface is obtained, wherein the rear load floor element 5 is arranged almost exactly at the level of the rear loading sill 6.

Figure 4A:
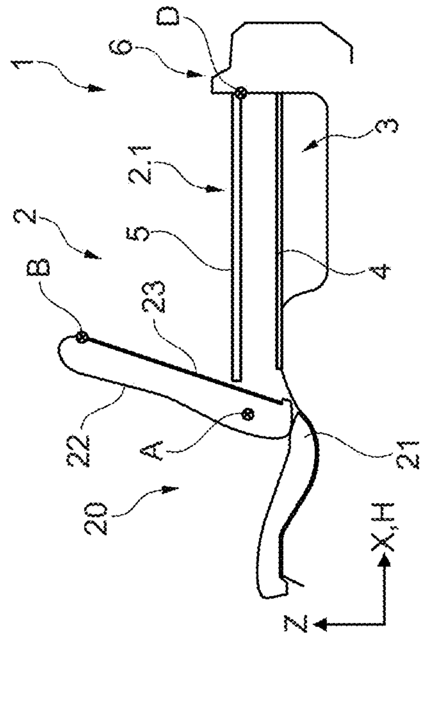
FIG. 4A is a side view of a third embodiment of a load floor arrangement with a vehicle seat in a sitting position.
Figure 4C:
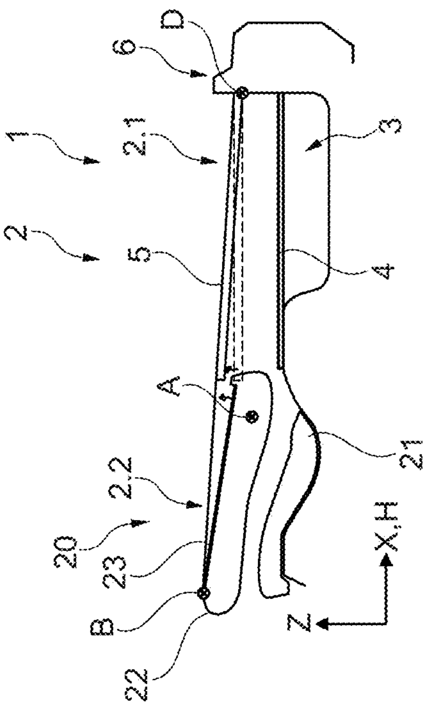
FIG. 4C is a side view of the load floor arrangement of FIG. 4A with the vehicle seat in the inclined position and a front load floor element in a pivoted position.
Figure 4B:
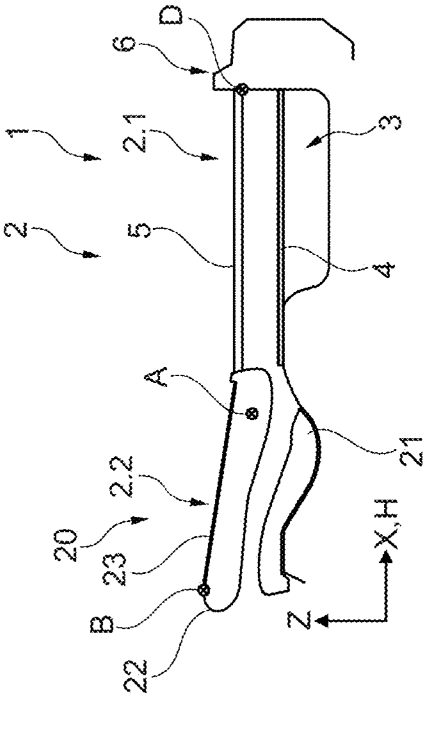
FIG. 4B is a side view of the load floor arrangement of FIG. 4A with the vehicle seat in an inclined position.

FIGS. 4A-4C show a third embodiment of a load floor arrangement according to the present disclosure, which differs from the first embodiment in that the rear load floor element 5 is connected to the load space 2 by a load space pivot axis D. The load space pivot axis D is arranged close to the rear loading sill 6 and extends in the vehicle transverse direction. FIGS. 4A and 4B correspond substantially to FIGS. 3A and 3B and in this respect will not be described again. In FIG. 4C, the front load floor element 23 has been adjusted into a pivoted position in which it has an inclination of approximately 5° relative to the horizontal H and is supported by means of the support arrangement 25, not shown. The rear load floor element 5 has been pivoted by a pivoting operation about the load floor pivot axis D from a horizontal first floor position into a second floor position in which it likewise has an inclination of approximately 5° relative to the horizontal H. Accordingly, the inclination of the front load floor element 23 corresponds to the inclination of the rear load floor element 5 and the two form overall a load surface which is slightly inclined but in itself flat. This surface is also very suitable for receiving long pieces of cargo 30. The rear load floor element 5 in the second floor position can either be supported directly within the load space 2 on the body or it could be supported via the front load floor element 23 and the support arrangement 25 thereof.

Figure 5A:
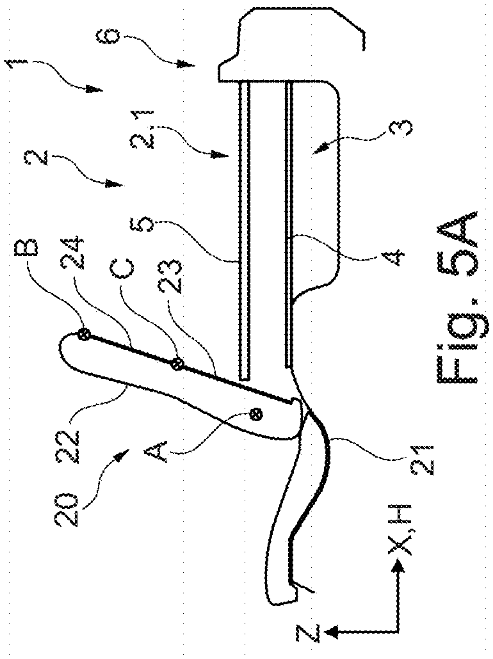
FIG. 5A is a side view of a fourth embodiment of a load floor arrangement with a vehicle seat in a sitting position.
Figure 5B:
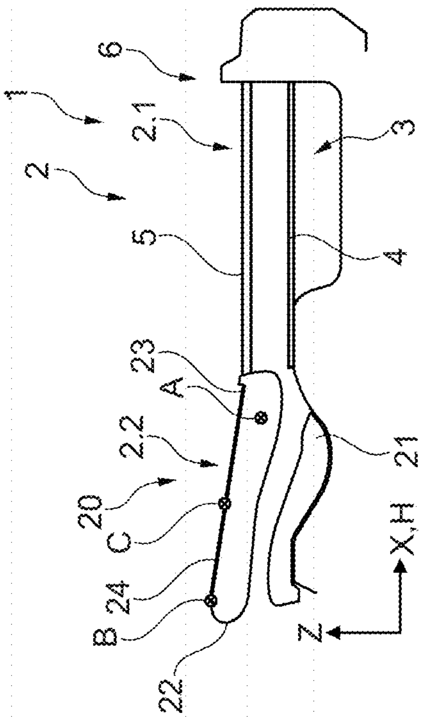
FIG. 5B is a side view of the load floor arrangement of FIG. 5A with the vehicle seat in an inclined position.
Figure 5C:
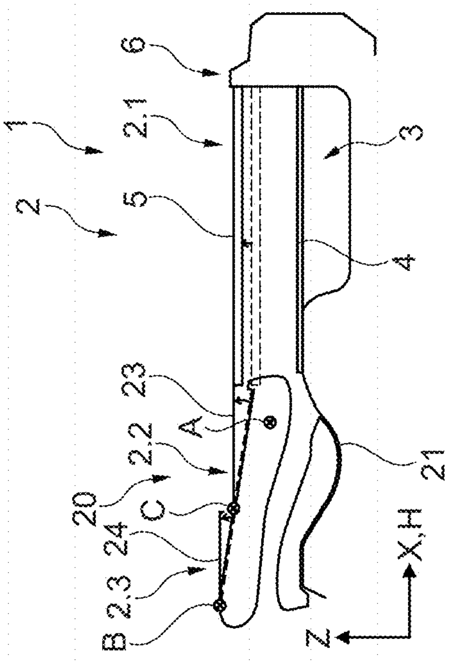
FIG. 5C is a side view of the load floor arrangement of FIG. 5A with the vehicle seat in the inclined position and two front load floor elements in a pivoted position.
Figure 5D:
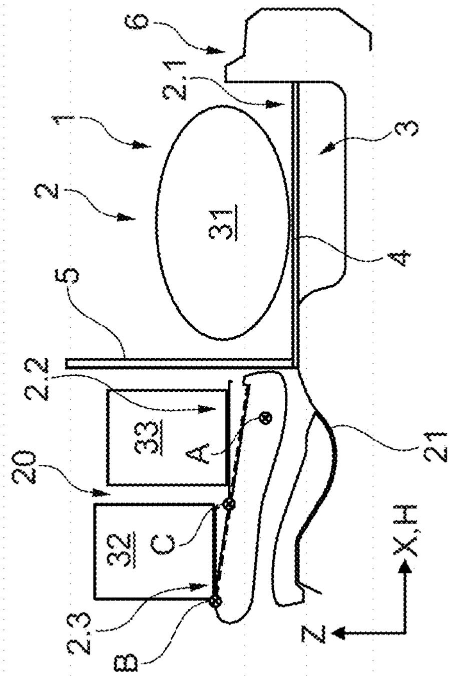
FIG. 5D is a side view, corresponding to FIG. 5C, of the load floor arrangement and of three pieces of cargo.

FIGS. 5A-5D show a fourth embodiment of a load floor arrangement 1 according to the present disclosure, in which there are arranged on the backrest 22 two front load floor elements 23, 24 which are pivotable about separate floor element pivot axes B, C. Both floor element pivot axes B, C extend parallel to the vehicle transverse direction and, like the front load floor elements 23, 24, are offset relative to one another in the vehicle longitudinal direction in terms of the inclined position shown in FIG. 5B. While the rear load floor element 5 in FIGS. 5A and 5B is in a first floor position, it has been raised in FIG. 5C into a second floor position in which it is flush with the rear loading sill 6. Furthermore, the two front load floor elements 23, 24 have been adjusted into a pivoted position in which they are arranged horizontally and are supported by use of the support arrangement 25, not shown. A front load floor element 23 thereby adjoins the rear load floor element 5 directly and forms therewith a flat, horizontal support surface consisting of a first floor portion 2.1 and a second floor portion 2.2. The other load floor element 24 is likewise arranged horizontally but is offset in the vertical direction relative to the other two load floor elements 5, 23. A third floor portion 2.3 is formed. In FIG. 5D, the rear load floor element 5 is arranged in a wall position and accordingly separates the second and third floor portions 2.2, 2.3 from the first floor portion 2.1, which in this case is formed by the lower floor element 4. As a result of the horizontal orientation of the two front load floor elements 23, 24, heavy pieces of cargo 32, 33 can be safely stored in this embodiment too, wherein the risk of damage to a damageable piece of cargo 31 is low.

Figure 6A:
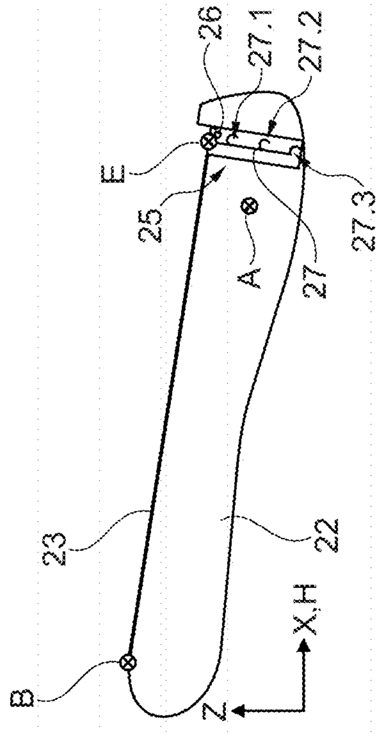
FIG. 6A is a side view representation of a backrest of a vehicle seat of a load floor arrangement according to one embodiment with a front load floor element in a first position.
Figure 6B:
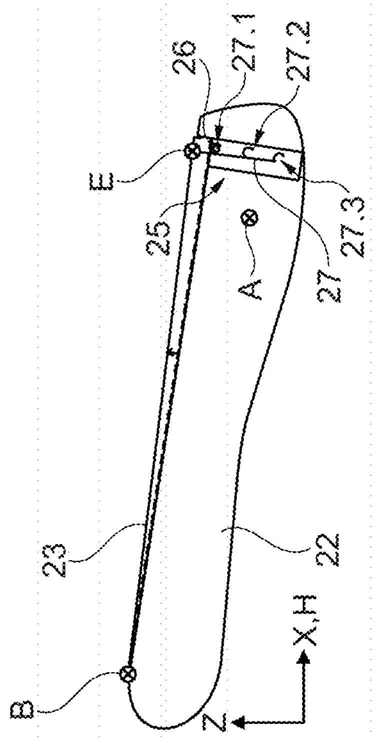
FIG. 6B is a side view representation of the backrest of a vehicle seat of a load floor arrangement shown in FIG. 6A with the front load floor element in a second position.
Figure 6C:
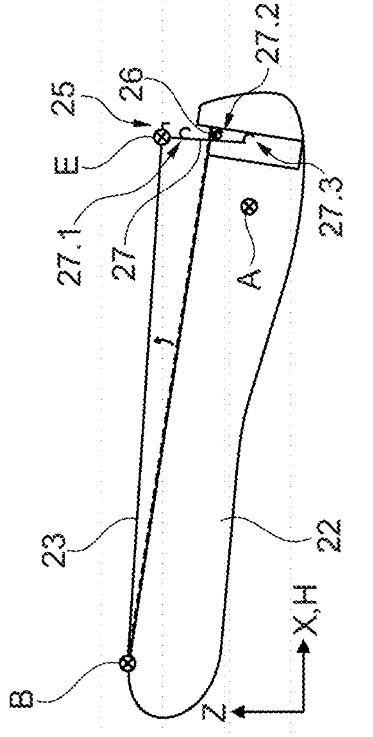
FIG. 6C is a side view representation of the backrest of a vehicle seat of a load floor arrangement shown in FIG. 6A with the front load floor element in a third position.
Figure 6D:
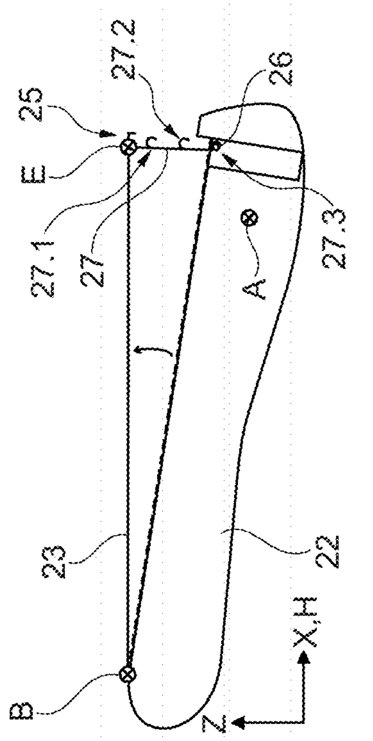
FIG. 6D is a side view representation of the backrest of a vehicle seat of a load floor arrangement shown in FIG. 6A with the front load floor element in a fourth position.
Figures 7A, 7B, 7C, 8A, 8B, 8C, 9A, 9B, 9C:
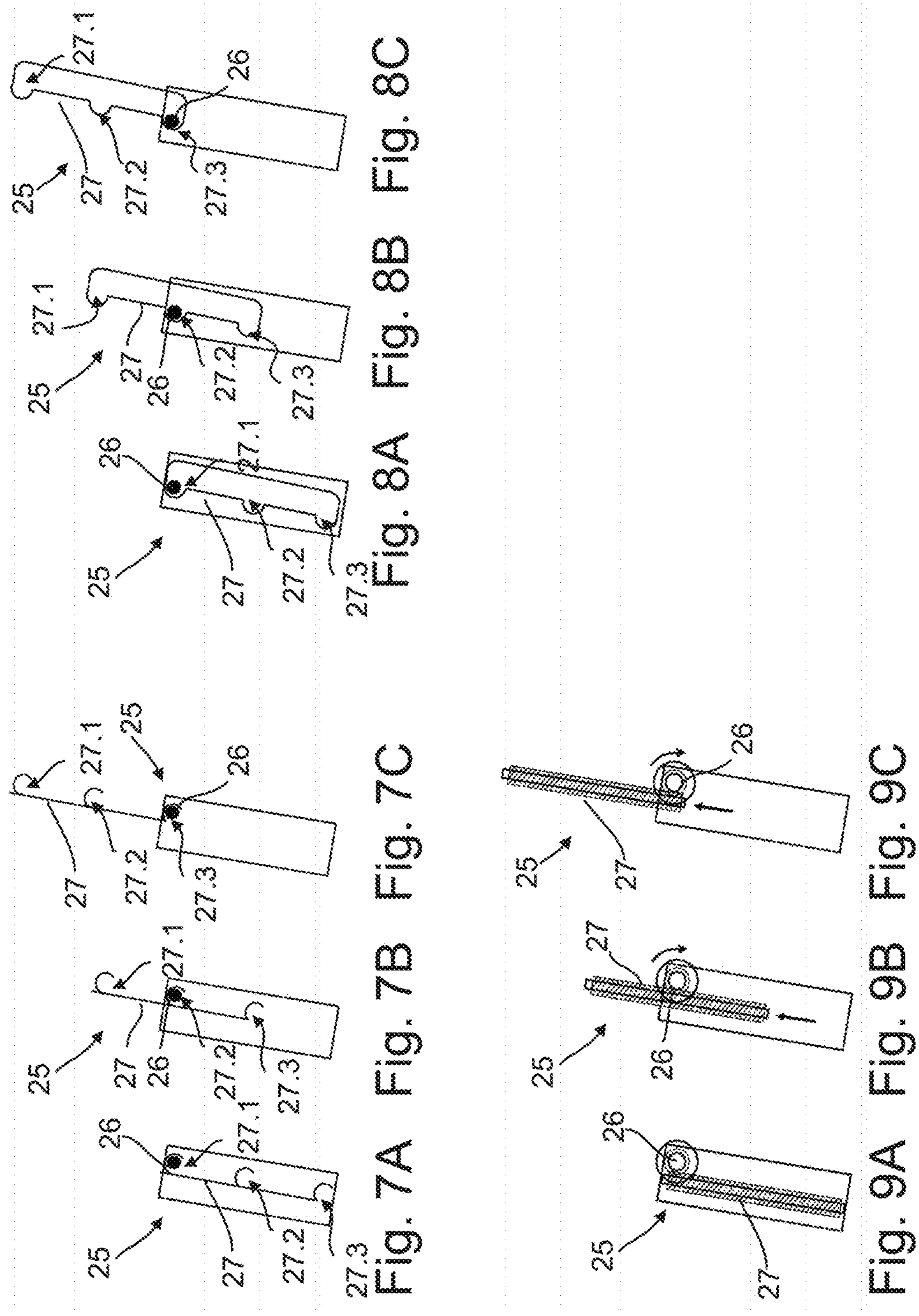
FIG. 7A is a detailed representation of a first embodiment of a support arrangement for a vehicle seat of a load floor arrangement in a first position.
FIG. 7B is a detailed representation of the support arrangement for a vehicle seat of a load floor arrangement shown in FIG. 7A in a second position.
FIG. 7C is a detailed representation of the support arrangement for a vehicle seat of a load floor arrangement shown in FIG. 7A in a third position.
FIG. 8A is a detailed representation of a second embodiment of a support arrangement for a vehicle seat of a load floor arrangement in a first position.
FIG. 8B is a detailed representation of a second embodiment of a support arrangement for a vehicle seat of a load floor arrangement shown in FIG. 8A in a second position.
FIG. 8C is a detailed representation of a second embodiment of a support arrangement for a vehicle seat of a load floor arrangement shown in FIG. 8A in a third position.
FIG. 9A is a detailed representation of a third embodiment of a support arrangement for a vehicle seat of a load floor arrangement in a first position.
FIG. 9B is a detailed representation of a third embodiment of a support arrangement for a vehicle seat of a load floor arrangement shown in FIG. 9A in a second position.
FIG. 9C is a detailed representation of a third embodiment of a support arrangement for a vehicle seat of a load floor arrangement shown in FIG. 9A in a third position.

FIGS. 6A-6D show, in an enlarged representation, a backrest 22 in an inclined position with a front load floor element 23, which as in the first embodiment is pivotable about a floor element pivot axis B which is arranged close to the head end of the seatback 22. Furthermore, a support arrangement 25 is shown, which has a first support element 26 stationarily arranged on the backrest and a second support element 27, which is connected to the front load floor element 23 so as to be pivotable about a support element pivot axis E. The first support element is configured in the manner of a pin, which extends in the vehicle transverse direction. Corresponding thereto, there are formed on the second support element a plurality of retaining structures 27.1-27.3. In the contact position shown in FIG. 6A, the first support element 26 is not in engagement with any of the retaining structures 27.1-27.3. In a first pivoted position, which is shown in FIG. 6B, the first support element 26 is in interlocking engagement with a first retaining structure 27.1, whereby the front load floor element 23 is supported relative to the backrest 22. In a corresponding manner, the first support element 26 can be brought into engagement with a second retaining structure 27.2 or with a third retaining structure 27.3, as shown in FIGS. 6C and 6D, in order to achieve a second and third pivoted position. In FIGS. 7A-7C, the support arrangement 25 is again shown individually corresponding to the first to third pivoted positions.

FIGS. 8A-8C show, schematically, a second embodiment of a support arrangement 25, in which the first support element 26 is again configured in the manner of a pin, but wherein the second support element 27 forms a guide link for the first support element 26, in which three retaining structures 27.1-27.3 are again formed.

FIGS. 9A-9C show a third embodiment of a support arrangement 25, by use of which the inclination of the front load floor element 23 in the respective pivoted position is adjustable virtually continuously. The first support element 26 is thereby in the form of a pinion which cooperates with a second support element 27 which is in the form of a rack. Each of the teeth of the rack thereby forms a retaining structure, which in turn corresponds to a separate pivoted position. By rotation of the pinion, the rack is displaced, wherein a suitable locking mechanism, not shown here, prevents the rack and the pinion from moving by themselves under the weight of the cargo. The pinion can be operated either by the user via a hand wheel or by means of a motor via a suitable actuator.

Figure 10A:
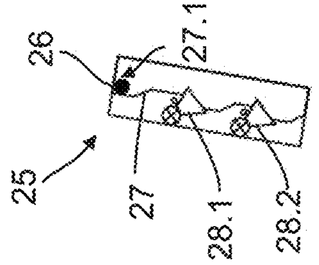
FIG. 10A is a detailed representation of a fourth embodiment of a support arrangement for a vehicle seat of a load floor arrangement in a first position.
Figure 10B:
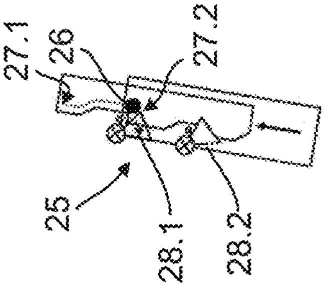
FIG. 10B is a detailed representation of the support arrangement for a vehicle seat of a load floor arrangement shown in FIG. 10A in a second position.
Figure 10C:
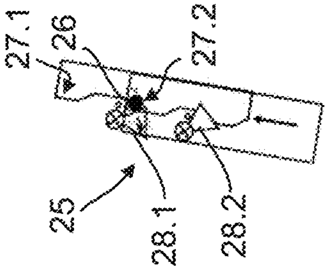
FIG. 10C is a detailed representation of the support arrangement for a vehicle seat of a load floor arrangement shown in FIG. 10A in a third position.
Figure 10D:
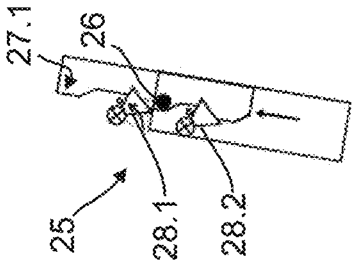
FIG. 10D is a detailed representation of the support arrangement for a vehicle seat of a load floor arrangement shown in FIG. 10A in a fourth position.
Figure 10E:
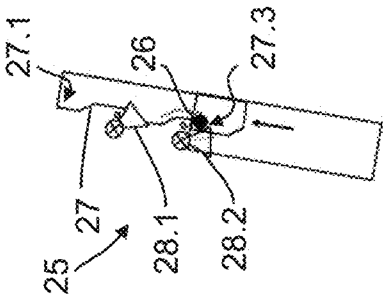
FIG. 10E is a detailed representation of the support arrangement for a vehicle seat of a load floor arrangement shown in FIG. 10A in a fifth position.
Figure 10F:
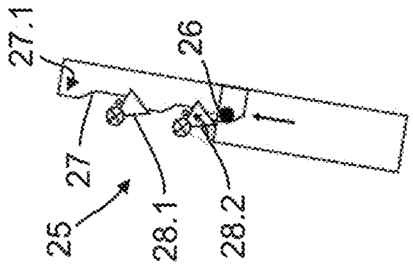
FIG. 10F is a detailed representation of the support arrangement for a vehicle seat of a load floor arrangement shown in FIG. 10A in a sixth position.
Figure 10G:
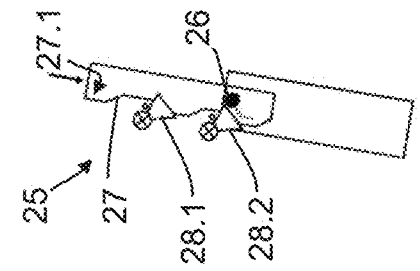
FIG. 10G is a detailed representation of the support arrangement for a vehicle seat of a load floor arrangement shown in FIG. 10A in a seventh position.
Figure 10H:
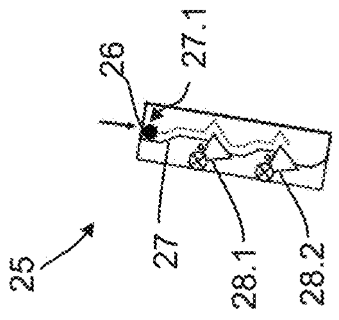
FIG. 10H is a detailed representation of the support arrangement for a vehicle seat of a load floor arrangement shown in FIG. 10A in an eighth position.

FIGS. 10A-10H show a fourth embodiment of a support arrangement, in which the first support element 26 is again configured in the manner of a pin and the second support element 27, similarly to the second embodiment, forms a guide link having retaining structures 27.1-27.3. However, in addition to the guide link, which in itself is rigid, two movable guide elements 28.1, 28.2 are provided, of which one is associated with the second retaining structure 27.2 and one is associated with the third retaining structure 27.3. If the front load floor element 23 is moved out of the contact position (which corresponds to FIG. 10A), the first support element moves along the guide link from the first retaining structure 27.1 to the second retaining structure 27.2, whereby it deflects the spring-loaded first guide element 28.1 against a return force until the first support element 26 finally engages with the second retaining structure 27.2 as shown in FIG. 10C. The second retaining structure 27.2, like the third retaining structure 27.3, has an edge extending transversely to the displacement direction shown by the arrows, which edge ensures a maximum retaining action on the first support element 26. If the front load floor element 23 is moved further, the first support element 26 leaves the second retaining structure 27.2, whereby the spring-loaded first guide element 28.1 returns to its starting position (see FIG. 10D) in the further course of the operation, the first support element 26, by deflecting the second guide element 28.2, comes into engagement with the third retaining structure 27.3, as shown in FIG. 10E. In order to transfer the front load floor element 23 back into the contact position, the user first moves it slightly further, whereby the first support element 26 leaves the third retaining structure 27.3 and the second guide element 28.3 returns to its starting position, as shown in FIG. 10F. In the further course of the operation, the first support element 26 simply slides along the guide link back to the first retaining structure 27.1, which is made possible by the fact that the second and third retaining structures 27.2, 27.3 are covered by the first and second guide elements 28.1, 28.2. The two guide elements 28.1, 28.2 thereby form ramp-like guide surfaces by which the first support element is in each case deflected over the retaining structures 27.2, 27.3.

It should be noted that the features and measures mentioned individually in the description can be combined with one another in any desired technically expedient manner and provide further embodiments of the disclosure. The description additionally characterizes and specifies the load floor arrangement in particular in connection with the figures.

As shown and described in this disclosure, a load floor arrangement for a motor vehicle is provided. There are suitable as motor vehicles in particular passenger cars, for example people carriers, minibuses, SUVs, saloon cars, estate cars or compact cars. The term "load floor arrangement" means in this context an arrangement of a plurality of elements which form part of a load floor of the motor vehicle or are arranged in the region of the load floor. "Load floor" denotes the region of the vehicle that is intended to be loaded with luggage, cargo or other (inanimate) objects. As an alternative, the term load-space floor can also be used.

The load floor arrangement has a rear load floor element which, in a floor position, forms a floor portion of a load space. The load space, which at least in some embodiments of the disclosure can also be referred to as the stowage space or boot, is generally the part of the interior of the vehicle that is provided for loads. In particular, the load space can be provided solely for loads, that is to say not for the occupants of the vehicle. The rear load floor element can be positioned at least in a floor position (optionally also fixedly installed in that floor position, although this is preferably the exception) in which it forms a floor portion of the load space. Depending on the usage situation, this floor portion can be part of the load floor or optionally also form the entire load floor. The load floor element can be positioned in the floor position, which means that it can normally be supported in this floor position, for which purpose suitable support structures can be present within the load space. In any case, the floor portion is intended to be loaded in the operating state, that is to say objects within the load space can stand on the floor portion. Normally, the rear load floor element is in the form of a panel and is at least predominantly flat, or has an at least predominantly flat surface which faces upwards when used as intended. As will become clear hereinbelow, the rear load floor element is preferably detachably arranged within the load space and can be arranged (or supported) in different, defined positions within the load space. In particular, a free space can be formed beneath the rear load floor element, which free space is delimited at the bottom by a secondary, or lower, load floor element or the like. In particular, the rear load floor element can be removable in order to expand the usable load space in the vertical direction.

The load floor arrangement further has a front load floor element which is connected to a backrest of a vehicle seat so as to be pivotable about a floor element pivot axis extending in the vehicle transverse direction, whereby it is adjustable between a contact position and at least one pivoted position in which its inclination relative to the horizontal is reduced compared to the contact position, when the backrest is inclined forwards in an inclined position about the backrest pivot axis. The front load floor element is arranged at least predominantly in front of the rear load floor element relative to the vehicle longitudinal axis (X-axis), that is to say closer to the front of the vehicle. Like the rear load floor element, it can be in the form of a panel and at least predominantly flat, or have an at least predominantly flat surface. It is connected to a backrest of a vehicle seat. The vehicle seat is normally one of the rear seats, or—where there are more than two rows of seats—the rearmost seat. The term “vehicle seat” explicitly also includes bench-type seats, or parts of bench-type seats, which are intended to be used by more than one occupant, wherein the backrests thereof can be folded down completely or also in a split manner, that is to say, for example, in each case by 50%, or also in each case by a third (⅓|⅓|⅓) or 40/60. The front load floor element is pivotably connected to the backrest about a floor element pivot axis extending in the vehicle transverse direction and is adjustable between at least two positions, namely a contact position, in which it can lie at least partially against the backrest, and a pivoted position pivoted relative to the backrest, in which it protrudes at least predominantly from the backrest. The adjustment can take place in particular manually, although it is possible that at least one actuator is configured to adjust the front load floor element in the described manner.

The floor element pivot axis extends in the vehicle transverse direction, that is to say parallel to the Y-axis, insofar as the corresponding vehicle seat is oriented towards the front of the vehicle. The corresponding pivot movement accordingly takes place in the X-Z plane. In the contact position, the front floor element can lie at least partially against the backrest, wherein the corresponding contact can be limited to a portion of the surface of the floor element that faces the backrest. In the contact position, the load floor element is accommodated as it were in a space-saving manner against the backrest. By contrast, in the at least one pivoted position it is pivoted relative to the backrest, that is to say at least part of the front load floor element is transferred by a pivot movement into a position in which it is spaced apart from the backrest. The floor element pivot axis can thereby be formed on an upper end portion of the load floor element, so that, in the pivoted position, a maximum distance relative to the backrest is obtained at the opposite lower end portion. Alternatively, the floor element pivot axis can, however, also be arranged, for example, in a middle region of the backrest. The back rest can in known manner be inclined, or pivoted, about a backrest pivot axis. This backrest pivot axis likewise extends in the vehicle transverse direction, that is to say parallel to the Y-axis. In the normal sitting position, the backrest extends upwards and normally obliquely backwards, while in an inclined position it is inclined forwards. If the front load floor element thereby remains in the contact position, it is normally inclined relative to the horizontal by an angle of, for example, from 10° to 30°, that is to say it does not extend horizontally. This is typically due to the fact that the backrest cannot be inclined further forwards because of the presence of the seat cushion.

As a result of the adjustability of the front load floor element, its inclination relative to the horizontal is, however, reduced in the at least one pivoted position compared to the contact position, when the backrest is in the inclined position. This can mean that, although there is still an inclination relative to the horizontal, the amount of inclination is smaller, or that the front load floor element extends parallel to the horizontal in the pivoted position, that is to say the inclination is reduced to zero. The horizontal hereby refers to the X-Y plane of the motor vehicle, which of course, depending on the current driving situation, does not correspond to the plane perpendicular to the direction of gravity. It could also be referred to as the horizontal plane or horizontal vehicle plane.

When the backrest is adjusted into the inclined position and the front load floor element is adjusted into the pivoted position, both the surface of the front load floor element and the surface of the rear load floor element can be used for loading. In this respect, the effectively usable load area is increased. The inclination of the front load floor element relative to the horizontal is reduced by the arrangement. There is accordingly obtained an almost or exactly horizontal support surface. As a result, the risk that objects placed on the front load floor element will shift or fall over is significantly reduced, wherein the cargo is at the same time always supported.

Although a backrest is mentioned here, it is possible in the case of a plurality of vehicle seats arranged next to one another, or in the case of a split bench-type seat, for a plurality of backrests arranged next to one another to each have at least one front load floor element described here, which has already been mentioned above.

In at least one floor position of the rear load floor element and at least one pivoted position of a front load floor element, the load floor elements are preferably arranged adjacent to one another, wherein the difference between an inclination of the front load floor element and an inclination of the rear load floor element is not more than 10°. The difference can further preferably be not more than 5° or not more than 2°. That is to say, the inclination of the front load floor element and the inclination of the rear load floor element correspond approximately or exactly. Furthermore, the load floor elements are arranged adjacent to one another, which means that a distance between the load floor elements both in the X-direction and in the Z-direction is not more than 5 cm, preferably not more than 3 cm, further preferably not more than 1 cm. In this embodiment, it is provided that the two load floor elements form at least approximately a continuous, flat load surface. It may therefore be preferred that an offset of mutually adjacent regions of the surfaces of the two load floor elements transversely to the surface of the rear load floor element is not more than 3 cm, not more than 2 cm or not more than 1 cm. The offset thereby corresponds to the distance in a direction transverse to the surface of the rear load floor element. That is to say, if the surface of the rear load floor element extends horizontally, the offset corresponds to the vertical distance. Accordingly there is either no offset or only a slight offset between the two load floor elements. It could also be said that the two load floor elements merge at least approximately steplessly into one another.

The inclination of at least one front load floor element relative to the horizontal in at least one pivoted position is not more than 10°, according to one embodiment. Further, the inclination can be not more than 5° or not more than 2°, according to other embodiments. The corresponding inclination is given by an inclination of the backrest relative to the horizontal and an inclination of the front load floor element relative to the backrest. If the inclination of the front load floor element is not more than 10° and the front load floor element can accordingly be considered to be oriented almost horizontally, the risk that objects placed thereon will shift or fall over is minimized.

In some embodiments it is sufficient if the front load floor element can be positioned in a single pivoted position. In an alternative embodiment, at least one front load floor element can be positioned in a plurality of pivoted positions with different inclinations. The different pivoted positions correspond to different inclinations and accordingly also to different pivot angles about the floor element pivot axis. As a result, different possibilities arise. If, for example, the inclination of the backrest in the inclined position is not always constant, an adjustment of the pivoted position could take place in dependence thereon. Moreover, the user could choose different pivoted positions in order either to achieve a minimal offset between the front load floor element and the rear load floor element or to achieve a minimal difference between the inclination of the front load floor element and the inclination of the rear load floor element, if both parameters cannot simultaneously be minimized.

Since the front load floor element is intended to be loaded, it is expedient if it can be supported in the pivoted position in some way, in order, for example, to prevent adjustment into the contact position. In principle, it would be possible for the front load floor element to be supported, for example, on a stationary part of the body or on the rear load floor element. However, according to one embodiment, each front floor element can be supported at the backrest by a support arrangement in each pivot position. The corresponding support arrangement is interposed in respect of the force flow between the front floor element and the backrest. Some parts of the support arrangement can be rigidly or movably connected to the front load floor element, while other parts can be rigidly or movably connected to the backrest. If adjustment by use of an actuator is provided, at least one actuator can be part of the support arrangement.

According to one embodiment, the support arrangement has a first support element arranged on the backrest and a second support element arranged on the front load floor element, wherein one of the support elements has a retaining structure for each pivoted position, with which the other support element engages in an interlocking manner in the pivoted position. Both the first and the second support element can be in single- or multi-part form and can optionally also consist of a plurality of components which are movably connected to one another. At least one retaining structure is formed on a support element, wherein the number of retaining structures corresponds to the number of pivoted positions provided. Each retaining structure is so configured that the other support element engages therewith in an interlocking manner in the respective pivoted position. As a result of the interlocking engagement, one holding element is supported on the other holding element, whereby the front load floor element is further supported relative to the backrest. The respective retaining structure can be, for example, a projection with which the other support element engages. The retaining structures can also be formed by teeth of a tooth system with which a counter-tooth system of the other support element engages. For example, one support element can be in the form of a rack and the other support element can be in the form of a pinion, wherein the respective pivoted position is changed by rotating the pinion.

According to one embodiment, the backrest has exactly one front load floor element, which normally extends along at least a predominant portion of the backrest. According to an alternative embodiment, the backrest has two front load floor elements which are offset relative to one another in the vehicle longitudinal direction in terms of the inclined position and which are pivotable about two floor element pivot axes arranged offset relative to one another. The two front load floor elements are offset relative to one another in the vehicle longitudinal direction in terms of the inclined position, it could also be said that, when the backrest is in the inclined position, the two load floor elements are arranged one behind the other in the vehicle longitudinal direction. Each of the load floor elements is thereby connected to the backrest so as to be pivotable about its own floor element pivot axis. Owing to the non-horizontal orientation of the backrest in the inclined position, there is an offset in the pivoted position between the surfaces of the two load floor elements, even though they are oriented parallel to one another. That is to say, the two load floor elements are arranged in a step-like manner relative to one another in the pivoted position. Accordingly, two mutually offset, smaller load surface portions can be obtained, each of which can in itself be oriented horizontally, for example. Of course, it is also possible to provide more than two load floor elements.

It may be advantageous under some circumstances if the rear load floor element can be supported in the load space in a plurality of floor positions with different inclinations relative to the horizontal. It is thereby normally arranged horizontally in a first floor position, while in a second floor position it is arranged so as to slope from the front to the rear in the vehicle longitudinal direction. The second floor position can thereby be combined with a pivoted position of the front load floor element, so that the two load floor elements are inclined relative to the horizontal but, as described above, form an almost or exactly even load surface, wherein the inclination of the front load floor element and the inclination of the rear load floor element are identical or have a slight difference (of, for example, not more than 10°). In this embodiment, it can also be provided that the rear load floor element is pivotably connected to the load space in a rear region of the load space by a load space pivot axis extending in the vehicle transverse direction.

In addition or alternatively, the rear load floor element can be capable of being supported in the load space in a plurality of floor positions at different heights. For example, a lower floor position can be provided for maximizing the available height in the load space when the backrest is in the sitting position, while an upper floor position is provided for minimizing the offset between the rear load floor element and the front load floor element when the backrest is in the inclined position and the front load floor element is in the pivoted position.

According to one embodiment, the rear load floor element, when the backrest is arranged in the inclined position, can be supported in a wall position at the rear adjacent to the backrest, in which wall position it is arranged at an angle of not more than 20° relative to the vertical. Support structures, or retaining structures, are thereby provided within the vehicle, which support, or hold, the rear load floor element in the mentioned wall position. The vertical corresponds to the Z-direction or vehicle vertical direction. The angle relative to the vertical can preferably be not more than 10° or not more than 5°. In the mentioned wall position, the rear load floor element is positioned to a certain extent in the manner of a wall and divides the effective, or expanded, load space into a front region, in which the at least one front load floor element is arranged, and a rear region. In this embodiment too, it is advantageous that the at least one front load floor element can be positioned almost or exactly horizontally in the pivoted position, since the risk that objects will shift or fall over is thereby minimized. In the event that an object correspondingly shifted or fell over, it would press against the rear load floor element situated in the wall position. Depending on the stability of the rear load floor element and the support thereof within the vehicle, this could lead to the rear load floor element becoming detached or even breaking. This in turn could lead to damage to cargo in the rear region. If the at least one front load floor element is transferred into the pivoted position, the risk that the outlined problems will occur is minimized.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A load floor arrangement for a motor vehicle, the load floor arrangement comprising:
- a rear load floor element that forms a floor portion of a load space in a floor position;
- a front load floor element pivotably connected at a front end to a backrest of a vehicle seat and pivotable about a floor element pivot axis extending in a vehicle transverse direction, wherein the front load floor element is adjustable between a contact position in which the front load floor element lies against the backrest and at least one pivoted position in which an inclination of the front load floor element relative to a horizontal is reduced compared to the contact position, when the backrest is inclined forwards in an inclined position about a backrest pivot axis; and
- a support arrangement located on the backrest and operatively coupled to the front load floor element and having at least one support element that may be adjusted in length to support a rear end of the front load floor element to adjust a height of the rear end of the front load element and the inclination of front load floor element when the backrest is inclined forwards in an incline position about a backrest pivot axis.

2. The load floor arrangement according to claim 1, wherein in at least one floor position of the rear load floor element and at least one pivoted position of a front load floor element, the rear and front load floor elements are arranged adjacent to one another, wherein a difference between an inclination of the front load floor element and an inclination of the rear load floor element is not more than 10°.

3. The load floor arrangement according to claim 1, wherein the inclination of at least one front load floor element relative to the horizontal in at least one pivoted position is not more than 10°.

4. The load floor arrangement according to claim 1, wherein the front load floor element can be positioned in a plurality of pivoted positions with different inclinations.

5. The load floor arrangement according to claim 4, wherein the front load floor element can be supported at the backrest in each pivoted position by the support arrangement.

6. The load floor arrangement according to claim 1, wherein the support arrangement has a first support element arranged on the backrest and a second support element arranged on the front load floor element, wherein one of the support elements has a retaining structure for each pivoted position, with which the other support element engages in an interlocking manner in the pivoted position.

7. The load floor arrangement according to claim 1, wherein the backrest has two front load floor elements which are pivotable about two floor element pivot axes arranged offset relative to one another.

8. The load floor arrangement according to claim 1, wherein the rear load floor element can be supported in the load space in a plurality of floor positions with different inclinations relative to the horizontal.

9. The load floor arrangement according to claim 1, wherein the rear load floor element can be supported in the load space in a plurality of floor positions at different heights.

10. The load floor arrangement according to claim 1, wherein when the backrest is arranged in the inclined position, the rear load floor element can be supported in a wall position at the rear adjacent to the backrest, in which wall position it is arranged at an angle of not more than 20° relative to the vertical.

11. A motor vehicle comprising:
- a load space;
- a vehicle seat having a backrest; and
- a load floor arrangement comprising:
  - a rear load floor element that forms a floor portion of the load space in a floor position;
  - a front load floor element pivotably connected at a front end to the backrest of the vehicle seat and pivotable about a floor element pivot axis extending in a vehicle transverse direction, wherein the front load floor element is adjustable between a contact position in which the front load floor element lies against the backrest and at least one pivoted position in which an inclination of the front load floor element relative to a horizontal is reduced compared to the contact position, when the backrest is inclined forwards in an inclined position about a backrest pivot axis; and
  - a support arrangement located on the backrest and operatively coupled to the front load floor element and having at least one support element that may be adjusted in length to support a rear end of the front load floor element to adjust a height of the rear end of the front load element and the inclination of the front load floor element when the backrest is inclined forwards in an incline position about a backrest pivot axis.

12. The motor vehicle according to claim 11, wherein in at least one floor position of the rear load floor element and at least one pivoted position of a front load floor element, the rear and front load floor elements are arranged adjacent to one another, wherein a difference between an inclination of the front load floor element and an inclination of the rear load floor element is not more than 10°.

13. The motor vehicle according to claim 11, wherein the inclination of at least one front load floor element relative to the horizontal in at least one pivoted position is not more than 10°.

14. The motor vehicle according to claim 11, wherein the front load floor element can be positioned in a plurality of pivoted positions with different inclinations.

15. The motor vehicle according to claim 14, wherein the front load floor element can be supported at the backrest in each pivoted position by the support arrangement.

16. The motor vehicle according to claim 11, wherein the support arrangement which has a first support element arranged on the backrest and a second support element arranged on the front load floor element, wherein one of the support elements has a retaining structure for each pivoted position, with which the other support element engages in an interlocking manner in the pivoted position.

17. The motor vehicle according to claim 11, wherein the backrest has two front load floor elements which are pivotable about two floor element pivot axes arranged offset relative to one another.

18. The motor vehicle according to claim 11, wherein the rear load floor element can be supported in the load space in a plurality of floor positions with different inclinations relative to the horizontal.

19. The motor vehicle according to claim 11, wherein the rear load floor element can be supported in the load space in a plurality of floor positions at different heights.

20. The motor vehicle according to claim 11, wherein when the backrest is arranged in the inclined position, the rear load floor element can be supported in a wall position at the rear adjacent to the backrest, in which wall position it is arranged at an angle of not more than 20° relative to the vertical.

* * * * *